Feb. 4, 1936.   A. L. KNAPP   2,029,534

MOTOR VEHICLE

Filed Nov. 25, 1930

Inventor
ARCHER L. KNAPP

Patented Feb. 4, 1936

2,029,534

UNITED STATES PATENT OFFICE 2,029,534

MOTOR VEHICLE

Archer L. Knapp, Detroit, Mich., assignor to Packard Motor Car Company, Detroit, Mich., a corporation of Michigan Application November 25, 1930, Serial No. 498,079

4 Claims. (Cl. 296—95)

The present invention relates to visors for use on automobiles and has particular reference to a device of this character which is adapted for use within the interior of the vehicle.

This invention contemplates and has for one of its objects the provision of a simple device which may be made, installed and operated with a minimum of mechanical complexities, and possessing features enabling it to be instantly and conveniently adjusted to the driver's need.

Another object is to provide a visor which is so constructed as to allow good vision while at the same time breaking up and minimizing the glare of sun or approaching headlight rays.

Other objects and advantages will become apparent from a reading of the specification taken in connection with the accompanying single sheet of drawing in which.

Figure 1:
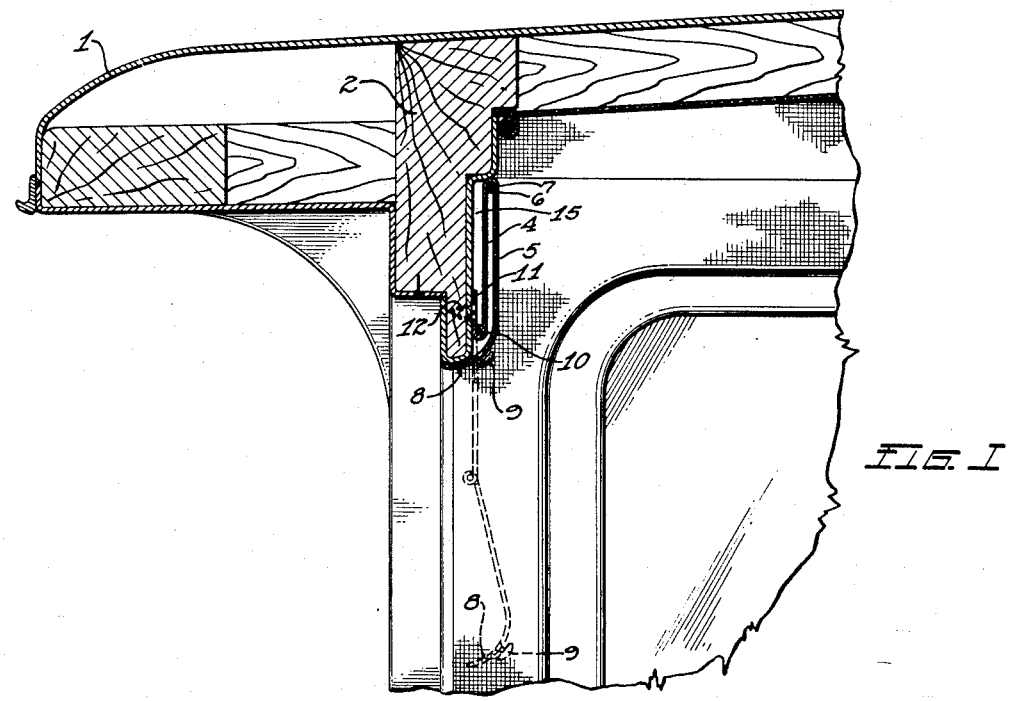
Fig. 1 is a view partly in side elevation and partly in section of the improved visor of this invention shown in attached position to the body of an automobile; the visor, as shown in full lines, is in its folded or inoperative position and is shown by dotted lines in its extended or operative position.

In the drawing, the forwardly extending top 1 of an enclosed type of automobile, and the forward laterally extending upper cross beam 2 of the body frame are shown, together with the vertically positioned windshield 3, all of ordinary construction.

My improved visor comprises two sections 4 and 5 which, in the preferred embodiment of the invention, are made of thin pieces of sheet steel or from other similar material. The two pieces 4 and 5 are joined in hinged relation to each other, as at 6, by an ordinary piano hinge joint having a pin 7 extending through the joint 6.

The lower section 5 is formed at its lower side with a curved portion 8 which conforms to the shape of the body when in inoperative or collapsed position as shown in full lines in Fig. 1. The curved portion 8 may be provided, on the side facing the interior, with a handle or knob 9 in order that the visor may be more readily manipulated.

The upper section 4 is hinged as at 10 in like manner to a laterally extending flange portion 11 which is secured to the lower edge of the cross beam 2 by means of screws 12 which extend through openings 13 provided in the flange 11.

Figure 2:
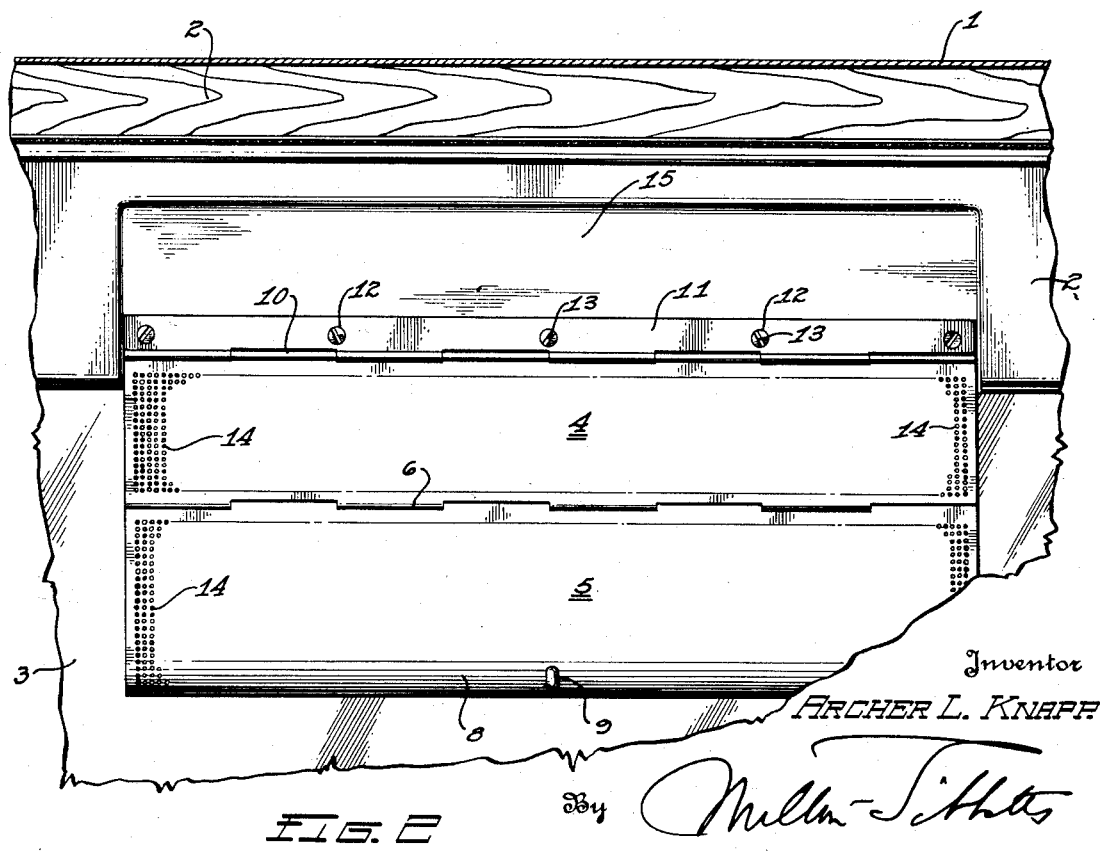
Fig. 2 is a front elevational view showing the visor in extended or operative position.

By reference to Fig. 2, it will be noted that the sections 4 and 5 of the visor are provided with small perforations 14 which cover practically the entire surface. By means of the above distribution of the openings 14, a clear vision may be had through the visor, but at the same time the bright rays of the sun or of approaching headlights will be broken up so that no glare will be apparent to the driver of the vehicle.

It may be here noted that the cross beam 2 is formed with a longitudinally extending recess 15 which is adapted to receive the sections of the visor when in its collapsed position. It will be noted that when the visor is in its collapsed position, the lower section 5 will lie flush with the surfaces of the cross member adjacent the recess and will form a closure which conceals the remaining sections of the visor, adding greatly to the neat appearance of the interior at this point.

The operation of my improved device is as follows:

The visor is normally folded up as shown in the full lines of Fig. 1 with the two sections 4 and 5 resting in parallel relation to each other in the recess 15, and the curved portion 8 of section 5 extending below the sections 4 and 5 and curving under the lower edge of the cross beam 2 to meet the windshield 3, thus conforming to the shape of the body at this point, and forming a compact and neat appearing construction. It will be noted that the curved portion 8 rests against the windshield when the visor is either in collapsed or extended position thus forming a stop which is adapted to maintain the lower section thereof in flush relation to the surfaces of the cross member adjacent the recess when the visor is collapsed or to maintain the whole visor in parallel spaced relation to the windshield when in its extended position. When the driver desires to bring the visor into his line of vision, he will merely grasp the handle 9 and pull downwardly and toward himself. The sections 4 and 5 will swing on an arc until they rest vertically and in parallel relation to the windshield or in any desired intermediate position. The type of hinge employed is of a character such that the friction therein is adequate to maintain the visor in a position of adjustment desired.

When the operator desires to return the visor to its collapsed position, he will again grasp the handle and push upwardly. The upper section 4 will move inwardly toward the driver as force is applied to the lower section 5, due to the piano hinge construction, and by further applying force thereto the sections will be again collapsed to their inoperative position.

It will be seen that an efficient and compact construction has been provided by the present invention and that economy of construction and simplicity of design have been borne in mind throughout.

While only one specific embodiment has been herein shown and described, it will be quite apparent that the construction illustrated is susceptible of numerous changes and modifications. For instance in the embodiment shown, the visor is intended to extend only the width of the driver's range of vision, but it might easily be extended to cover the whole windshield so as to protect other occupants of the vehicle. It will also be apparent that the visor could be constructed of any number of sections, provided with any type of frictional joint, or could be made of a translucent material. If constructed of the latter material the visor may or may not be provided with perforations. Other modifications may also be made in the invention without departing from the spirit or scope thereof which is to be limited only by the appended claims.

What is claimed is:

1. In a motor vehicle body, a windshield header bar extending transversely across the body, the rear face of the bar having a recessed portion, a visor composed of a plurality of aligned members frictionally hinged together along adjacent edges, and friction hinge means securing an end member of the visor to the header bar within the recessed portion thereof, said visor members being foldable to lie substantially within the recessed portion of the header bar with the outermost member flush with the main portion of the rear face of the bar.

2. In a motor vehicle, the combination of a header bar; a visor comprising a plurality of sheet metal plates arranged in alignment, the adjacent marginal portions of adjacent plates being hinged together to allow the plates to swing relatively in planes transverse to the planes of the plates, and a hinge pin engaging said adjacent marginal portions, the engagement of the sections with the pin frictionally maintaining the plates in any angular position of adjustment; and means securing a visor end plate against the rear face of the header bar.

3. In a motor vehicle body, a windshield header bar extending transversely across the body, the rear face of the bar being recessed, a visor composed of aligned sections hinged together along their adjacent marginal portions, and means for hingedly securing one of the end sections to the header bar within the recess, said visor being substantially entirely within the recess when out of use.

4. In a motor vehicle, the combination of a windshield, a support above the windshield and a visor mounted at the rear of the windshield and comprising a light obstructing plate, a friction hinge for directly connecting one margin of said plate to said support on the inner side thereof to swing about a horizontally extending axis substantially parallel with the plate and for maintaining the plate in any position of adjustment, a second light obstructing plate and a friction hinge directly connecting the other margin of said first plate with one margin of the second plate to allow the plates to be swung relatively about a horizontal axis in an arcuate path from parallel position to aligned position and for maintaining said plates in any relative position of adjustment in such range of adjustment, said visor being adjustable to lie entirely above the windshield.

ARCHER L. KNAPP.